UNITED STATES PATENT OFFICE.

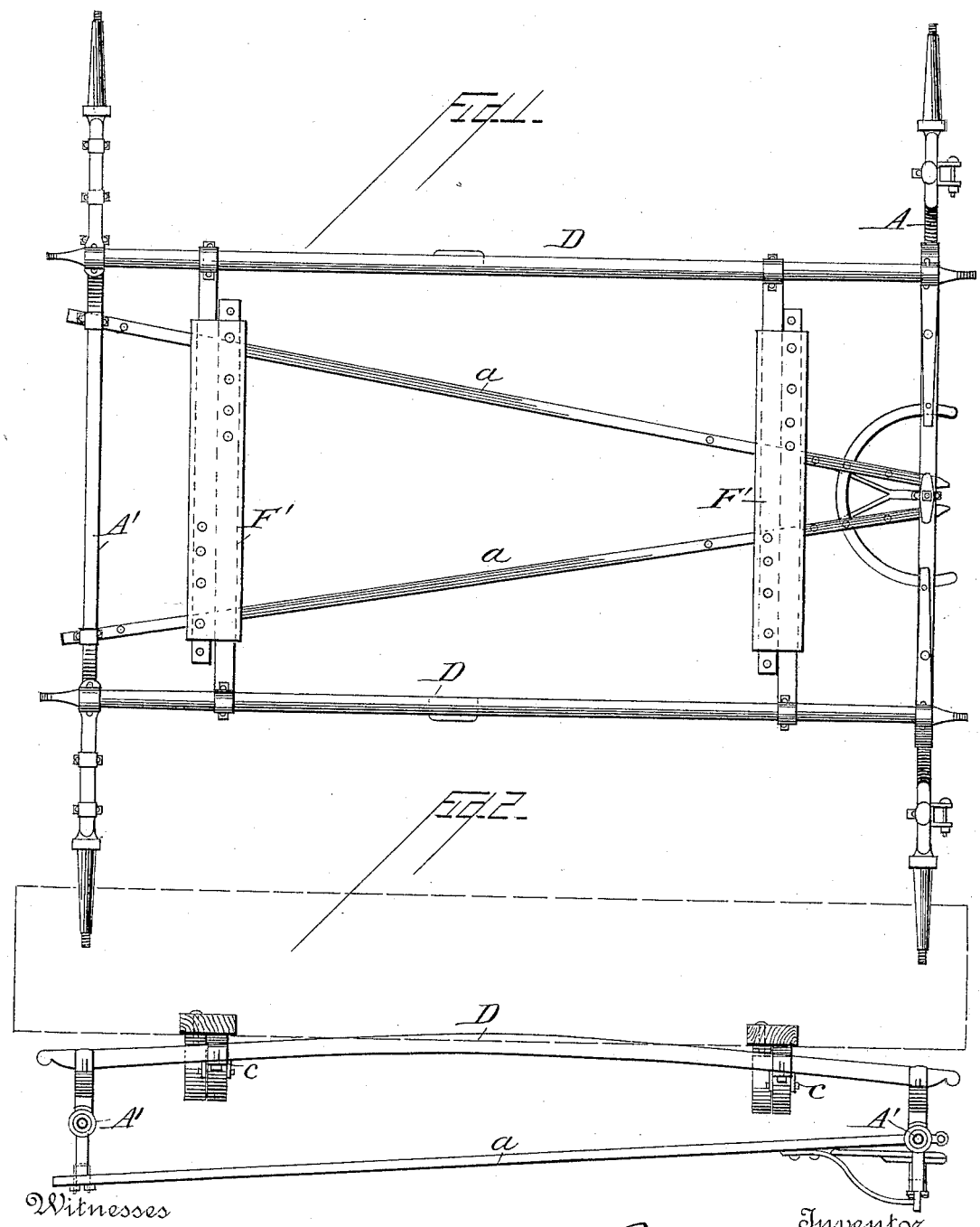

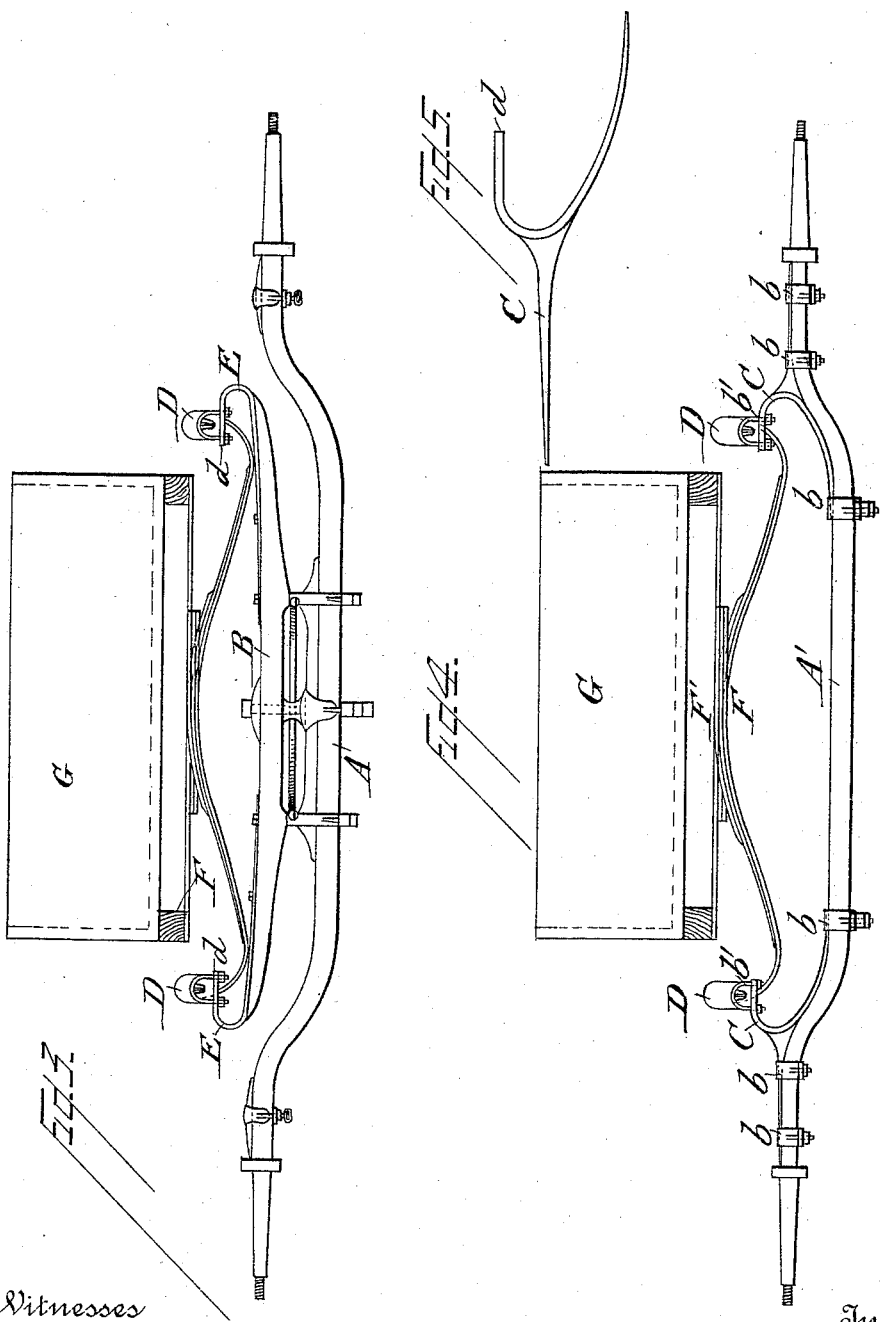

JOSEPH TILTON, OF NEW YORK, N. Y., ASSIGNOR OF ONE-HALF TO RUFUS M. STIVERS, OF SAME PLACE.

VEHICLE RUNNING-GEAR.

SPECIFICATION forming part of Letters Patent No. 395,191, dated December 25, 1888.

Application filed October 26, 1888. Serial No. 289,204. (No model.)

*To all whom it may concern:*

Be it known that I, JOSEPH TILTON, a citizen of the United States, residing at New York, in the county of New York and State of New York, have invented certain new and useful Improvements in Vehicle Running-Gears; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in the running-gear of vehicles by which the body is allowed to extend over the axles and is at the same time brought so low as to be convenient of access and the center of gravity of the whole vehicle retained at such a point as to render its upsetting in turning corners at great speed almost an impossibility.

In constructing this improved gear both front and rear axles are cranked downward, the rear axle being provided with peculiarly-constructed supports which carry the rear end of the side bars, the front ends of which are supported upon a bolster that rests upon and is pivoted upon the front axle. Connected to each of these side bars is a pair of springs, each one of which is attached at one end to a side bar and at the other to a bed-piece, upon which rests the vehicle-body.

In the accompanying drawings, which illustrate this invention, Figure 1 is a plan showing the arrangement of parts. Fig. 2 is a side elevation showing the relative positions vertically of the side bars, reach, and other parts. Fig. 3 is a front end elevation. Fig. 4 is a rear end elevation, and Fig. 5 shows one of the side-bar supports detached from the axle.

In the several figures, A represents the front axle, and A' the rear axle, of a vehicle running-gear. Both these axles are cranked or bend downward at points near the shoulder of the spindle at either end, so that the main portion or body of the axle is lower than the spindle, thus allowing the reaches, springs, and body to be correspondingly lowered. Upon the front axle is mounted a bolster, B, connected with said axle by the ordinary bolt and circle-iron, which allow them to turn freely upon each other. This bolster is connected with the rear axle by the reaches $a$ $a$, which are attached to the bolster in closer proximity to each other than their points of attachment to the rear axle, thus causing them to stand diagonally to the axial line of the vehicle, and not only connect the axle and bolster, but brace the same against side strains.

Secured to the rear axle by means of clips $b$ are the two side-bar supports C C. These supports are of a peculiar form, designed not only to support the rear end of each side bar, D, but to be of such form as to add to the beauty and symmetry of this part of the vehicle. They are constructed with a curved part, $d$, projecting upward and provided with a seat for the side bar, which is secured thereto by a clip, $b'$. The lower part of the support is divided into two branches, which extend in opposite directions along the top of the axle, each branch being rounded on top and fitting snugly to the axle, following its bends, and in outward appearance forming a part of the same. The front ends of these side bars, D, are connected with the bolster B by the supports E, curved something like the letter V, the lower arm being fitted for the top of said bolster and firmly secured thereto, the upper arm being provided with a seat for the side bar and attached thereto by clips in the same manner that the rear end is secured upon the supports C. By this method of securing and supporting the side bars it will be seen that the whole space between them is left clear for the body and springs upon which it is carried, and that the downward bend in the axles allows these parts to be placed very low.

The springs F are attached to the side bars by an ordinary swivel-clip, $c$, which allows free movement to the spring without putting any torsional strain upon the side bars. The preferred form of these springs is that shown in the drawings, each spring being in two parts composed of a series of leaves overlapping each other in the usual manner, the parts extending by each other and bolted to a bed-piece, F', upon which the body G is placed. This body may be of greater length than the distance between the axles, but is of less width than the space between the side bars, so that in its vertical movement upon the springs it shall keep clear of said side bars, and thus prevent abrasion of the sides of the body and consequent disfigurement of the same, the construction of the springs aiding to produce this result by compelling the body to move in nearly vertical lines. It will, however, be understood that any spring so constructed as to be attached to the side bars and pass beneath the body from side to side may be substituted for the springs F. It will also be apparent that, if desired, the side-bar supports C might be welded to the axle or formed integral with the same without departing from the spirit of my invention.

Having thus described my invention, I claim as new and desire to secure by Letters Patent the following:

1. In a vehicle running-gear, the combination, with a rear cranked axle and side bars, of the side-bar supports secured by clips to the axle and extending upward in a curved line corresponding with the curve of the cranked portion of the axle, as set forth.

2. In a vehicle running-gear, the side-bar support constructed with one arm extending along the top of the axle in the direction of the wheel, another following the bend of the axle, and a third extending upward in a curved line to connect with the side bar, substantially as shown and described.

3. In a vehicle running-gear, the bolster and the curved side-bar supports bolted to the bolster and secured by a clip to the side bar, in combination with the side bars, their rear supports, and the cranked axles, all arranged to allow the body to be placed low and extend over the axles, as shown and described.

In testimony whereof I affix my signature in presence of two witnesses.

JOSEPH TILTON.

Witnesses:
G. BURROUGHS,
S. M. CHANDLER.